(12) United States Patent  (10) Patent No.: US 6,572,431 B1
Maa  (45) Date of Patent: *Jun. 3, 2003

(54) COMPUTER-CONTROLLED TALKING FIGURE TOY WITH ANIMATED FEATURES

(76) Inventor: Shalong Maa, 816 McDeavitt Dr. #1077, Arlington, TX (US) 76011

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 924 days.

(21) Appl. No.: 08/833,342

(22) Filed: Apr. 4, 1997

Related U.S. Application Data (60) Provisional application No. 60/014,905, filed on Apr. 5, 1996.

(51) Int. Cl.[7] .................................................. A63H 3/28
(52) U.S. Cl. ......................................... 446/301; 369/63
(58) Field of Search .............................. 446/298–303; 369/63; 434/167, 307 R, 308, 185

(56) References Cited

U.S. PATENT DOCUMENTS

| | | | | |
|---|---|---|---|---|
| 3,685,200 A | * | 8/1972 | Noll ........................... | 446/299 |
| 4,846,693 A | * | 7/1989 | Baer ........................... | 434/308 |
| 5,111,409 A | * | 5/1992 | Gasper et al. ............... | 345/302 |
| 5,636,994 A | * | 6/1997 | Tong ........................... | 434/308 |

* cited by examiner

Primary Examiner—Stephen F. Gerrity
Assistant Examiner—John Paradiso
(74) Attorney, Agent, or Firm—Shalong Maa (57) ABSTRACT

Disclosed herein is improvement of computer-controlled animated talking toy system in which novel methods and apparatus are provided to coordinate and control the sound and animation of a toy figure. Said toy figure has at least one articulated movable portion for providing animation with the actuation thereof provided by a multi-phase electromechanical drive device disposed therein which is feasible for digital control by a multimedia computer connected thereto. An audio output device is disposed within the body of said toy figure and is connected to and controlled by the sound subsystem of said computer. The animation of the toy is controlled by said computer according to detailed text content of the toy's audio speech. In order to synchronize the sound and animation of the toy figure, said computer is programmed to create digital-control signals for transmitting to said drive-control circuitry based on predefined rules of detecting the sequences and positions of vowel letters in the toy's speech synthesized by the computer, therefore the actuation of the toy's movable body part can be synchronized with the playback of audio speech without predefining the text content of said speech.

26 Claims, 5 Drawing Sheets

COMPUTER-CONTROLLED TALKING FIGURE TOY WITH ANIMATED FEATURES

This is a continuation of application Ser. No. 08/833,342 filed Apr. 4, 1997 and claims the benefit of U.S. Provisional Patent Application No. 60/014,905, filed Apr. 5, 1996.

FIELD OF THE INVENTION

The present invention relates generally to animated talking toys and more particularly pertains to new and improved interactive toy system wherein the actuation of a movable portion of the toy and the sound thereof are controlled and coordinated by a multimedia computer connected thereto.

BACKGROUND OF THE INVENTION

It is well known in the prior art to employ advanced electronic devices in designing animated sounding toys, such as those disclosed in U.S. Pat. No. 50,074,821 (McKeefery et al.), U.S. Pat. No. 4,923,428 (Curran), U.S. Pat. No. 4,850,930 (Sato et al.), U.S. Pat. No. 4,767,374 (Yang), U.S. Pat. No. 4,775,352 (Curran, et al.). However, the entertainment and education benefits of the interactive toys of this type are restricted by their limited data storage capacities and lack of effective synchronization means. These drawbacks are partially caused by the use of rotary drive devices, such as DC or servo motors, which require rather complicated gearing systems for coupling with the articulated body parts of the toys, therefore, direct coordination and interaction between the sound and animation of the toy systems can not be realized. This is why the prior art interactive talking dolls do not provide realistic sound and animation effect at all. Meanwhile, since the allure of the sophisticated electronics and their miniaturization have encouraged the manufacturers to make interactive dolls with more elaboration and complexity, the costs to make such toys have risen dramatically.

U.S. Pat. No. 5,636,994 issued on Jun. 10, 1997 to Vincent M. K. Tong discloses a computer-controlled interactive toy system in which sound/speech synthesizing means of the toy is provided by a computer connected thereto, and the actuation of a movable boy part of the toy, such as its mouth, is provided by a DC Motor disposed therein. It is understood that in Tong's system, the driving power and the control of the DC motor is provided by an amplifier for increasing the level of the audio signal from the computer, and by a rectifier for converting said amplified signal to a DC signal for driving the DC motor. Tong's system does not utilize the computer to provide direct interactive control of the actuation device, nor to coordinate the sound and animation of the dolls. It is well known that lack of effective and economical synchronization means for coordinating the sound and animation has dramatically limited the entertainment value of all of the prior art interactive toy systems. Although a computer is provided in Tong's system as a sound source for the doll, it is not employed to improve the synchronization aspect of the interactive toy system at all.

It has been known to those in the art to employ computerized image-animation methods to provide entertainment devices with synchronized audio and video sequences. However, these synchronization methods are not suitable for control of an interactive toy system in which the animation thereof is actuated by electro-mechanical devices of the type having completely different control-response pattern compared with computer-animated images shown on a computer monitor. For example, U.S. Pat. No. 5,111,409 issued on May 5, 1992 to Gasper et al. discloses a computer animation and synchronization system including a random-access user interface that enables a user to create, control and display lip-synchronized animated on-screen images on a frame-by-frame basis. In Gasper's system, image animation and sound synchronization are controlled by a real-time random-access interface driver, which is a software system called RAVE scripting language, together with a descriptive and authoring language, called RAVEL, for defining and describing the synthesized images. Such RAVE scripting language was designed to provide realistic synchronization of lip positions of on-screen image sequences with the sound, which requires very short timing units. Therefore, such RAVE scripting language can not be used to control electro-mechanical actuation devices used in interactive toy system which require much longer response time.

Thus, it would be appreciated if appropriate apparatus and methods can be provided to synchronize the sound and animation of an animated talking toy.

SUMMARY OF THE INVENTION

Accordingly, an object of the present invention is to provide an animated talking toy with the animation thereof controllable by external digital signals.

Another objective of the present invention is to provide an improved animated talking toy in which the actuation of the toy's movable body part is provided by a two-phase electro-mechanical driving means that is operable by digital electronic signals.

To achieve the foregoing and other objects of the present invention and to remedy drawbacks of the prior art described above, there is provided an improved arrangement of computer-controlled animated talking toy system. According to one aspect of the present invention, an improved computer-controlled talking toy system includes, in combination with a multimedia computer, a toy figure which has at least one movable body part for providing animation effect. Disposed within the body of said toy figure includes a sounding device, such as a sound speaker, and actuation means for driving the articulated body part of the toy figure. Said actuation means is comprised of a multi-phase electro-mechanical driving device, such as a solenoid, and a drive-control circuitry for controlling said drive device according to digital signals transmitted from said multimedia computer connected thereto. Said sounding device is connected to and controlled by the sound subsystem of said computer.

According to another aspect of the present invention, in order to synchronize the animation of the toy figure with its audio output, said computer connected thereto is provided with synchronization system to create digital-control signals for transmitting to the drive-control circuitry of the toy figure according to the digital sound signals sent to the sounding device. For example, the computer may be programmed to create digital-control signals according to arrangement of vowel letters in the toy figure's speech synthesized by the computer.

The foregoing is intended to be merely a summary and not to limit the scope of the specification. The features of the present invention, which are believed to be novel, are set forth with particularity in the annexed claims. The invention, however, together with further objects and advantages thereof, may best be appreciated by reference to the following detailed description taken in conjunction with the drawings.

BRIEF DESCRIPTION OF THE DRAWINGS

FIG. 4a is for attaching the toy's arm; FIG. 4b is for attaching the movable portion of the toy's mouth.

DETAILED DESCRIPTION OF THE INVENTION

Referring to FIGS. 1–7, there is shown new and improved computer-controlled interactive toy systems embodying the concepts of the present invention. While the present invention is susceptible to embodiments in various forms, there is in the drawings and will hereinafter be described presently preferred embodiments, with the understanding that the present disclosure is to be considered as exemplifications of the invention, and does not limit the invention to the specific embodiments illustrated. In some instances, for purposes of explanation and not for limitation, specific numbers, or dimensions, or materials, etc., may be set forth in order to provide a thorough understanding of the present invention. In other instances, detailed descriptions of well-known mechanical elements or electronic circuitry are omitted so as to not obscure the depiction of the present invention with unnecessary details. In the case when alternate arrangements of a device or component are described or displayed, like parts or components may be assigned with the same reference numbers.

Figure 1:
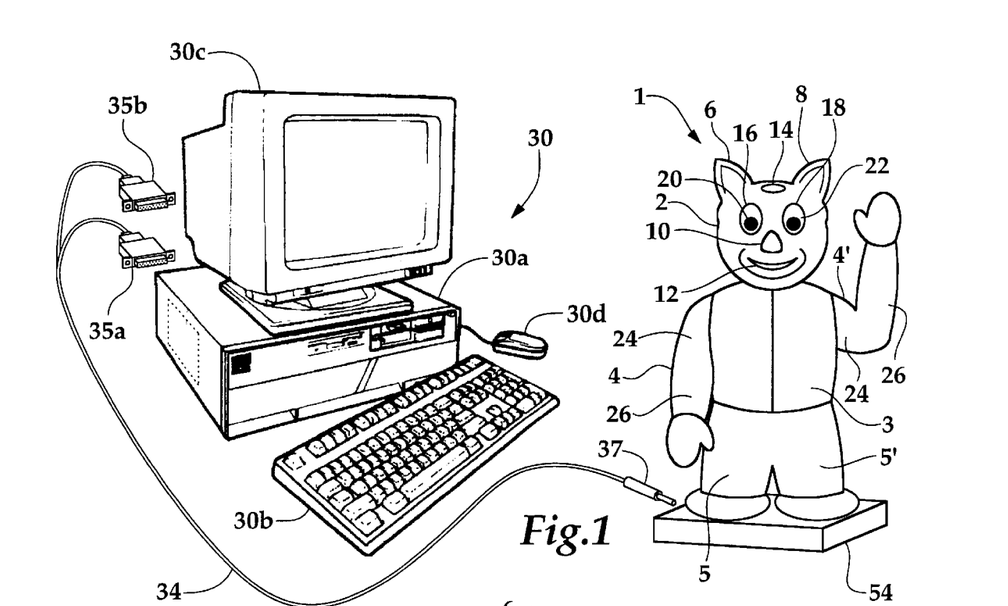
FIG. 1 is a diagrammatic prospective of a computer-controlled interactive toy that embodies the concepts of the present invention.

As seen in FIG. 1, a preferred computer-controlled interactive toy, according to the present invention, includes a toy FIG. 1 in combination with a multimedia system 30, having sound and processing subsystems for controlling the sound and animation of the toy FIG. 1, and with transmitting means 34 for transmitting sound and digital-control signals from the computer 30 to the toy FIG. 1. The multimedia system 30 may be a multimedia computer, as shown in the drawings, or an Internet TV, or the like, or it may be of any other type of digital devices with multimedia/audio capability. The transmitting means 34 may be, preferably, a connection cable, as shown in the drawing, or the like, or it may be replaced by wireless or remote transmitting devices installed in both the computer 30 and the toy FIG. 1 so that the toy can be carried around by a child user.

The toy FIG. 1 of the present invention may be a doll, as depicted in the drawing as an exemplification, or a puppet, or the like, or it may be in form of any other type of commonly known entertainment figures, and it should be made of any type of feasible materials known to those in the field. The toy FIG. 1 has at least one movable portion for providing animation effect. It is preferred that said at least one movable portion of the toy FIG. 1 is its mouth portion or the like for simulating the voicing or sounding of a living being or the like, although other body portions of the toy FIG. 1 may also be animated.

The computer 30 of FIG. 1 may be of any type of market-available multimedia computer, which may include a monitor 30c, a keyboard 30b, a mouse 30d, and a main processing and data-storage unit 30a having appropriate hardware and software systems for supporting all necessary functioning and operations. The computer 30 also includes appropriate interface devices and software system for connecting and transmitting digital signals to the toy FIG. 1. The connection cable 34 of FIG. 1 includes plug(s) 35a–35b at one end for connecting to the computer 30 and a plug 37 at the other end for connecting to the toy FIG. 1.

The toy FIG. 1 of the present invention can take any of the usual forms and construction of an entertainment device, such as a doll, wherein the major body parts are characterized by a head member 2, a torso portion 3, and a pair of legs 5/5'. As shown in FIG. 1, the head member 2 of the toy FIG. 1 is mounted on the torso portion 3 which is supported by the two legs 5/5'. The entire toy FIG. 1 may be mounted onto and being removable from a base member 54. Attached to the two sides of the torso portion 3 are a pair of arms 4 and 4' respectively, each comprising an upper arm 24 and a forearm 26. The head member 2 may be comprised of a pair of ears 6 and 8, a nose 10, a mouth portion 12, and a pair of eyes 20 and 22 including eyelids 16 and 18 respectively. The toy FIG. 1 may be adapted to include, at its torso portion 3, an interchangeable cover such as cloth or the like, and at its head portion 2, a removable head cover 14 for simulating the toy's hair or hat or the like.

It is appreciated that the animation feature of the toy FIG. 1 of FIG. 1 is provided by moving of its mouth portion 12 for simulating a sounding behavior of an living being or the like. For example, the mouth portion 12 may be controlled by the computer 30 to open and close for simulating talking or voicing of a person. The toy FIG. 1 may be adapted for moving of its other body portions, such as the two arms 4/4', the two eyes 20/22, the eyelids 16/18, or the entire head member 2 or the torso portion 3. For example, the arm 4 may move relative to the torso portion 3, and/or may bend at the pivotal juncture between its upper arm 24 and forearm 26. Alternatively, more than one body part of the toy FIG. 1 may be set to move at the same time.

Figure 2:
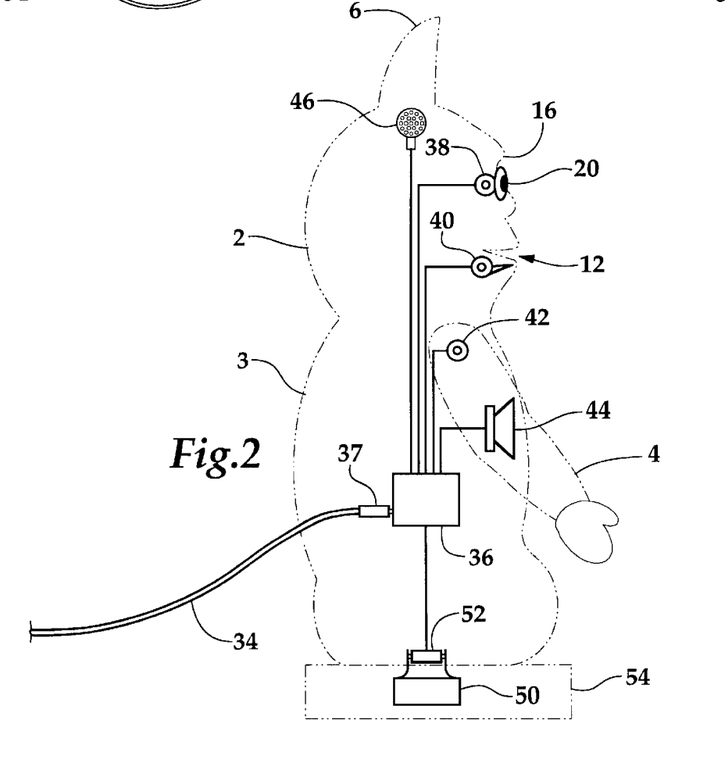
FIG. 2 is a schematic cross-section of the toy figure of the present invention, illustrating detailed inside arrangement the toy figure of FIG. 1.

In FIG. 2 is illustrated the toy figure 1's inside structure in which includes an audio output means 44 such as a loudspeaker or the like mounted at an appropriate position inside the toy's body for providing audio output for the toy, a drive device 40 disposed at an appropriate position inside the toy's body or head portion for providing actuation means for the toy's movable body part, a drive-control circuitry 36 for timing and selectively controlling electric power sent to the drive device 40 according to digital-control signals received from the computer 30 via the transmitting means 34, and a power supply means 52 for providing electric power for the drive-control circuitry 36 and the drive device 40. The combination of the drive device(s) 40, the drive-control circuitry 36, and the power supply means 52 may be considered as the actuation system of the toy FIG. 1. The interior of the toy FIG. 1 may also include an audio input means 46 such as a microphone for receiving and transmitting external sound received by the toy FIG. 1 to the computer 30 via the transmitting means 34. Said microphone 46 may be mounted inside the head or body portion of the toy FIG. 1, with the understanding that inclusion of such device is optional.

The audio output means 44 and/or the audio input means 46 of the toy FIG. 1 may be connected directly, or via the drive-control circuitry 36, to the sound subsystem of the computer 30 through the transmitting means 34. Apparently, more drive devices shall be provided for control by the drive-control circuitry 36 if other body portions of the toy FIG. 1 are selected to be animated. For example, as shown in FIG. 2, additional drive devices 38 and 42 are provided for moving, respectively, the eyes 20/22 and the arm 4/4' of the toy FIG. 1. In order to simplify the driving mechanism, the both two eyelids 16 and 18 may be attached to and controlled by the drive device 38 via an appropriate leverage system so that they can open and close together. It is preferred that the drive devices 40, 38 and 42 are multi-phase electro-mechanical devices, such as solenoids, and that these devices, together with the drive-control circuitry 36, are feasible for digital control by digital-control signals received from a the computer 30 via the transmitting means 34.

The power supply means 52 may be of any type of commonly known power supply devices. For example, as seen in the drawing, it may be a rechargeable battery 52 mounted at an appropriate position near the bottom portion of the toy FIG. 1's interior, in which case the base 54 may include a battery charging unit 50 near its top portion for charging the rechargeable battery 52 when the toy FIG. 1 is mounted onto the base 54. Alternatively, the power supply means 52 may be integrated with the drive-control circuitry 36, or it may be replaced by regular batteries mounted within toy FIG. 1, in which case base 54 may not include the battery charging unit 50. Also alternatively, electric power supply for the drive-control circuitry 36 and the drive devices 38, 40, and 42 may be provided by the computer 30, in which case the cable 34 may include additional connections for transmitting said electric power from the computer 30 to the toy FIG. 1.

It is appreciated that the control of the toy FIG. 1's sound and animation and the synchronization thereof, according to the present invention, is provided by the multimedia computer 30, and that the drive devices 38, 40, and 42 and the drive-control circuitry 36 are feasible for digital control by the multimedia computer 30. It is preferred that the devices 38, 40, and 42 are multi-phase electro-mechanical driving devices such as solenoids, although other types of rotary driving devices known to those in the art may also be used, such as stepper or servo or DC motors which may require more complex gearing systems and drive-control circuitry in order for digital control.

Figure 3A:
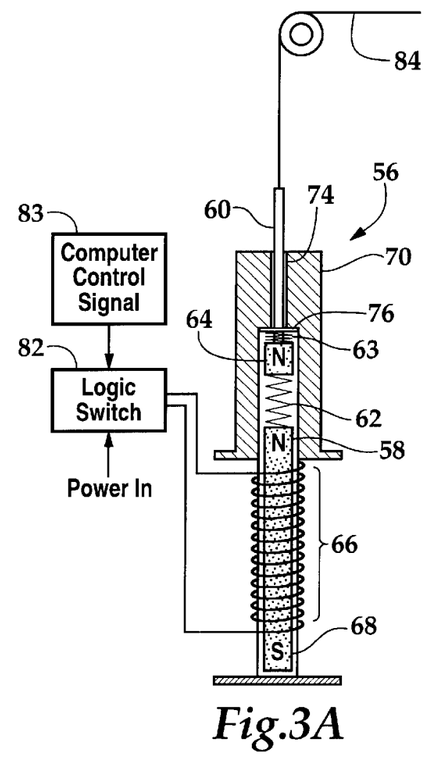
FIGS. 3a–b are two sectional views, to an enlarged scale, showing, respectively, the two operation phases of an exemplified digital-controlled electro-mechanical actuation system for moving the articulated body part of the toy figure of FIG. 2.
Figure 3B:
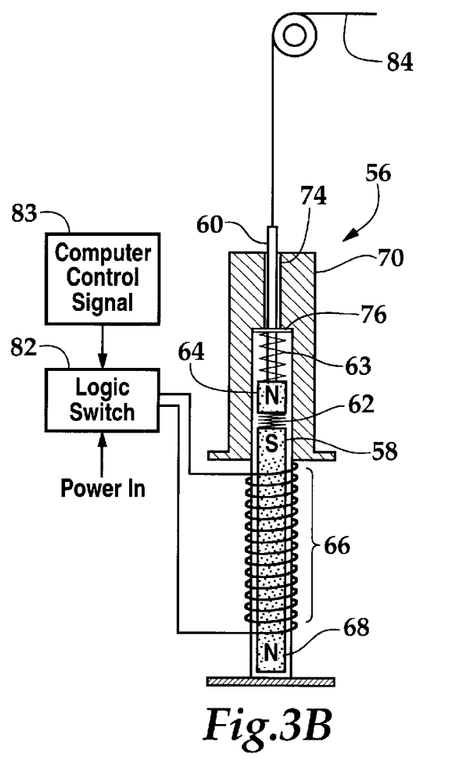

Referring now to FIG. 3, in which is illustrated an exemplified arrangement of a preferred multi-phase electro-mechanical drive device 56 for use as the devices 38, 40, and 42 shown in FIG. 2. The device 56 takes form of a two-phase solenoid, although other type of solenoid known to those in the art may also be used. As seen in FIG. 3, the device 56 includes a cylindrical housing 70 having an cylindrical interior with an elongated cylindrical opening 74 at its top portion. Disposed within the cylindrical interior of the housing 70 is a static cylindrical magnet 58 of appropriate dimension with its lower portion 68 firmly attached to the interior bottom of the housing 70. Also disposed within the cylindrical interior of the housing 70 at its top portion above the magnet 58 is a movable magnetic plunger 64 having a T-shaped lower end of appropriate dimension that fits to the interior of the housing 70 and an upper shaft portion 60 passing through the cylindrical opening 74 of the housing 70. The two magnets 58 and 64 are separated by a return spring 62. Another return spring 63 is mounted on the lower portion of the shaft 60 between the top end 76 of the housing 70's cylindrical interior and the T-shaped lower end of the magnetic plunger 64. It is preferred that magnet 58 is made of soft magnetic material (soft iron), and magnet 64 is made of permanent magnetic material. A solenoid wiring or coil 66 of appropriate length and dimension is wound against the lower portion of the housing 70's exterior.

Attached to the top of the shaft 60 is coupling means 84 for coupling the magnetic plunger 64 to the movable body part of the toy FIG. 1. It is preferred, and as shown in the drawing, that said coupling means takes form of a connection string 84. Alternatively, the connection string 84 may be replaced by an appropriate leverage system. The driving mechanism for the device 56 is provided by magnetic interaction between the movable magnetic plunger 64 and magnetic field generated by the solenoid coil 66 and the soft magnet 58: when electric current of appropriate direction and intensity passes through the solenoid wiring 66, the magnet field therefore generated near the lower portion of the magnetic plunger 64 will pull down the plunger 64 to its lower-limit position against the springs 62 and 63 (FIG. 3*b*); electric current of opposite direction will cause the plunger 64 to be pushed up to its upper-limit position (FIG. 3*b*). The return springs 62 and 63 are to keep the plunger 64 at an appropriate neutral or default position when the solenoid coil 66 is disconnected from its power supply.

The electric power or current supply for the solenoid coil 66 of the device 56 and the control thereof is provided by the drive-control circuitry 36 (FIG. 2) which is further controlled by the computer 30. The drive-control circuitry 36 may be understood as a logic switch, as illustrated in FIGS. 3 in which a logic switch circuitry 82 is depicted as to be controlled by the digital signals 83 transmitted from the computer 30. The logic switch 82 may be understood as a portion of the drive-control circuitry 36 of FIG. 2. The function of the logic switch 82 is to control electric power supply for the solenoid coil 66 according to digital signals 83 received at its logic input. For example, the logic switch 82 may connect the solenoid coil 66 to its electric power source in response to receiving the logic signal "1" at its logic input, and disconnect the coil 66 from its electric power source in response to receiving the logic signal "0" at its logic input. The logic switch may also include means for changing direction of electric current through the coil 66. The logic switch 82 may be comprised of a single electronic device. For example, it may be a Field-Effect Transistor (FET) or a Analog Transmission Gate or the like, or it may be of other type of digital transmission-control devices known to those in the art.

The drive device 56 has two stable states, as seen in FIGS. 3A and 3B respectively, which is controlled by the drive-control signals transmitted from the computer 30 to the logic input of the logic switch 82 for switching electric power supply for the coil 66 of the device 56. It is understood that the drive-control signals received at the logic input of the switch 82 may be the same as, or may be converted from the digital-control signals transmitted form the computer 30, depending on detailed arrangement of the drive-control circuitry 36 and the interface system of the computer 30.

It is understood that additional electronic functions/devices can be added to the drive-control circuitry 36/82 and to the drive device 56 to provide the actuation system of the present invention with more sophisticated and elaborate features. For example, devices such as capacitor, Zener, and diode may be included in the drive-control circuitry 36/82 to improve the response speed of the drive device 56 and to suppress arcing from the coil 66; if necessary, appropriate digital devices may be included in the circuitry 36 to transfer digital signals received from the computer 30 to the desired drive-control signals for controlling the logic switch 82, etc.; and the drive-control circuitry 36/82 may also be designed for controlling multiple solenoids. Because of the existence of the return springs 62/63, the movement range of the magnetic plunger 64 of the device 56 is dependent on the intensity of the magnetic field, which is determined by the electric current and the wiring configuration of the solenoid coil 66. So alternatively, the solenoid coil 66 may have one or more lead at an appropriate intermediate position along the wiring for connecting to the drive-control circuitry 82/36 so that the circuitry 82/36 may determine which portion of the solenoid wiring 66 shall be provided with electric current according to desired moving range of magnetic plunger 64.

Figure 4A:
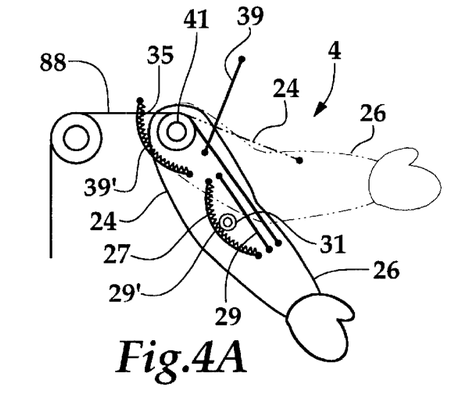
FIGS. 4a–b are schematic illustrations of exemplified arrangements for attaching the movable body parts of the toy figure of FIG. 2 to its adjacent stationary portion.
Figure 4B:
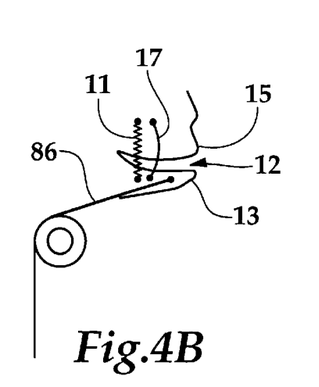

It is appreciated that the actuation device 56 is designed in such a way that there is direct actuation correspondence between the plunger member 64 of the device 56 and the toy figure 1's movable body portion connected thereto via the coupling means 84, and that rotary gearing system is not needed in coupling the plunger 64 to the movable body portion of the toy FIG. 1. Since manufacturing costs for the preferred drive device 56 is low, each independent movable part of the toy can be provided with one such drive device. It is preferred that the movable body part of toy FIG. 1 are pivotally attached to or engaged with its stationary portion at an appropriate position, having a return spring attached thereto for urging said movable body part of the toy to its default or neutral position when the corresponding drive device 56 is disconnected from its power source. Such an arrangement for attaching and activating the toy's movable body part is exemplified in FIGS. 4, although other feasible arrangement or designs known to those in the art for attaching a toy's articulated movable portion may also be utilized.

Referring first to FIGS. 4b in conjunction with FIGS. 2–3, the mouth portion 12 of the toy FIG. 1 includes an stationary upper jaw 15 and an articulated and movable lower jaw 13 pivotally attached to rest part of the head member 2 of the toy. A connection string 86 is provided for attaching, at one end, to the movable member 13 at an appropriate position, and, at the other end, to the plunger member 64 of the drive device 40 which may take the form of the drive device 56 of FIGS. 3. In this way, the drive device 40 can control the opening and closing of the lower jaw 13 of the mouth 12 for simulating voicing behavior of the toy FIG. 1 by pulling/releasing the connection string 86 according to digital signals transmitted from the computer 30. A return spring 11 of appropriate length and strength is provided for connecting the movable lower jaw 13 to the stationary upper jaw 15 of the mouth 12 from inside in order for urging the lower jaw 13 to its default or neutral position against the upper jaw 15 when the drive device 40 is deactivated. Alternatively, in order to limit the moving range of the movable lower jaw 13, a limit string 17 of appropriate length may be provided for connecting between the upper jaw 15 and the lower jaw 13 at appropriate positions, as shown in the drawing. Also alternatively, the connection string 86 may be replaced by an appropriate leverage system.

Referring now to FIG. 4a in conjunction with FIGS. 2–3, unlike the mouth portion 12, the moving of the arm 4 of the toy FIG. 1 may involve two degrees of freedom, i.e., the moving of the forearm 26 relative to the upper arm 24, and the upper arm 24 relative to the torso portion 3; the actuation of such a two-degree moving of the arm 4 may be provided by one drive device 42 by using the arrangement described hereinbelow.

As shown in the drawing, the forearm 26 and the upper arm 24 are pivotally connected to one another at a pivot 31; and the upper end of the upper arm 24 is pivotally attached to one side of torso portion 3 of the toy FIG. 1 at a pivot 41. Both the pivots 31 and 41 may include a surrounding pulley means in combination therewith. A return spring 27 of appropriate length and strength is provided for connecting between the forearm 26 and the upper arm 24 via the lower side of the pulley means surrounding the pivot 31; and a limit string 29 of appropriate length is provided for connecting between the forearm 26 and the upper arm 24 via the opposite or upper side of the pulley means surrounding the pivot 31. Similarly, a return spring 35 of appropriate length and strength is provided for connecting between the upper arm 24 and the torso portion 3 of the toy FIG. 1 via the lower side of the pulley means surrounding the pivot 41; and a limit string 39 of appropriate length is provided for connecting between the upper arm 24 and the torso portion 3 of the toy figure via the opposite or upper side of the pulley means surrounding the pivot 41. It is preferred that the two springs 35 and 27 have similar strength.

The mechanical coupling between the drive device 42 and the arm 4 of the toy FIG. 1 is provided by a connection string 88 which is attached, at one end, to the movable forearm 26 at an appropriate position, and, at the other end and via the pulley means surrounding the pivot 41, to the plunger member of the drive device 42 which may take form of the drive device 56 of FIGS. 3. In this way, when the drive device 42 pulls the connection string 88, the arm 4 will move with two degrees of freedom as described above against the springs 27 and 39; and when the drive device 42 is disconnected from its power source, the springs 27 and 35 and the limit strings 29 and 39 will urge and maintain the default or neutral positions of the forearm 26 and the upper arm 24 respectively. Alternatively, additional limit strings 29' and 39' may be provided and installed along the springs 27 and 35 respectively for providing better control of the moving ranges of the forearm 26 and the upper arm 24 respectively, as shown in the drawing.

Figure 6:
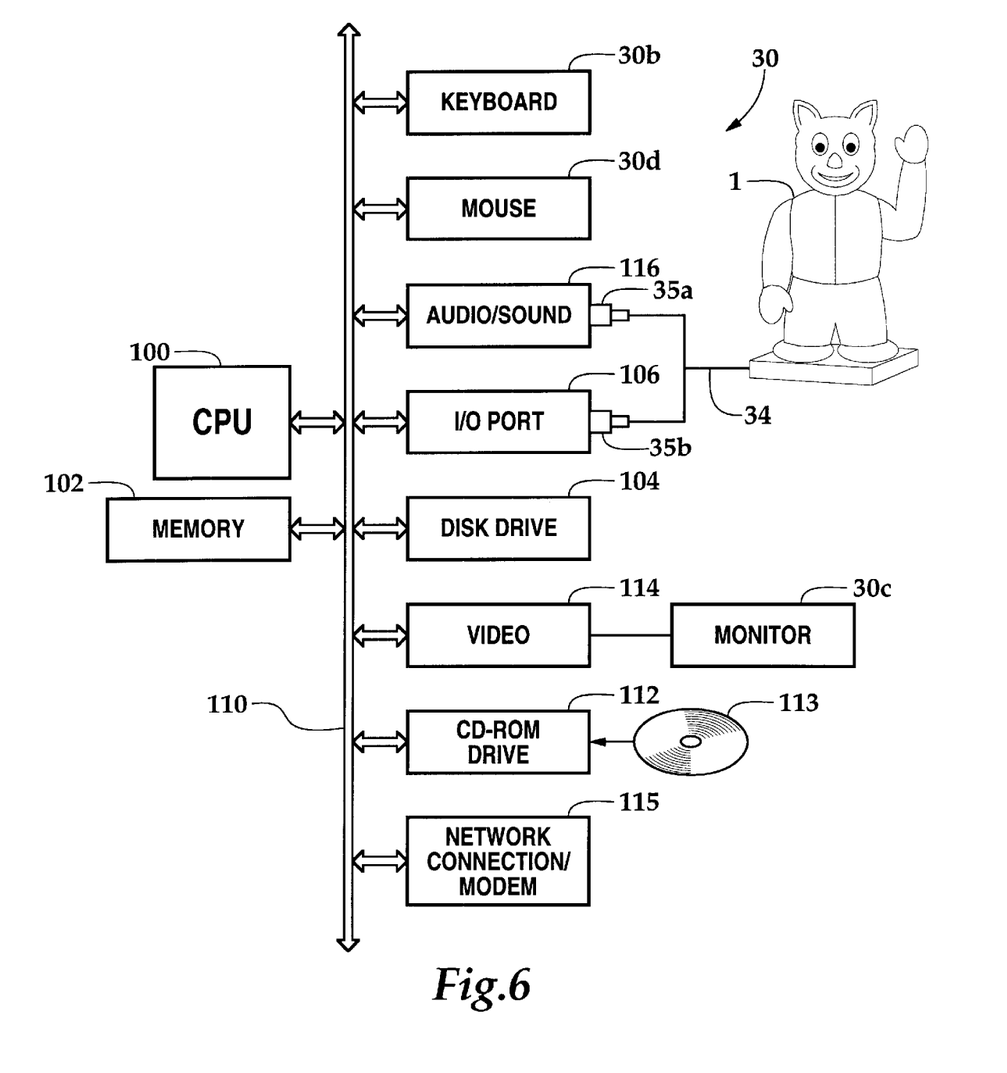
FIG. 6 is a schematic block diagram of the computer-controlled interactive toy system of FIG. 1, showing the components of the computer.

Referring now to FIG. 6 in conjunction with FIG. 1, synchronous control of the toy's moving part with playback of audio speech is provided, according to the present invention, by computer 30. The computer 30 is preferably a standard multimedia computer such as a standard IBM compatible PC or a Macintosh, or it may be a Network Computer (NC), a Internet TV, or a mainframe or workstation computer, or it may be of any other type of computing devices installed with multimedia systems. The computer 30 has the basic functions of a conventional computer such as data processing, data storage, data movement, and operating control means. For example, as seen in FIG. 6 and as well known to those in the art, the computer 30 may include the following basic components: a central processing unit (CPU) 100 to provide data processing and operating control functions, memory means 102 for storing digital signals that are to be directly accessed by the computer CPU 100, a hard disk drive 104 to permanently store digital files, interface system 106 for moving data between the computer 30 and its external peripheral devices, interconnection data-flow bus (es) 110 for communication among the computer 30's processing and data storage/memory units and peripheral devices, and a motherboard, the main circuit board of the computer 30 on which the computer's main electronic components are installed. The computer 30 may also include the following basic interactive/multimedia peripheral devices: a CD-ROM (or DVD) drive or the like 112 for receiving an external data storage media 113, a monitor 30c, a keyboard 30b, a mouse 30d, and network connection means 115 such as a modem or the like for connecting to the Internet or other data network. It is understood and as well known to those in the art that the computer 30 shall be provided with appropriate hardware and software subsystems for supporting these peripheral devices. For example, as seen in FIG. 6, the computer 30 may also include a video subsystem 114 for supporting image display on the monitor 30c, and an audio/sound subsystem 116 for supporting the audio output means 44 of the toy FIG. 1 connected thereto via the cable 34.

The computer 30 of FIG. 6 further includes an interface (hardware/software) subsystem 106 for facilitating connection and data communication between the computer 30 and the drive-control circuitry 36 of the toy FIG. 1. The interface subsystem 106 may be comprised of the standard I/O or interface components of a standard computer for connecting to the cable 34, or a custom-designed interface device/card may be provided and installed at the computer 30's expansion slots, provided that the design for the drive-control circuitry 36 shall be adapted accordingly, and that appropriate software systems are installed in the computer 30 for supporting all necessary operations described herein.

It is appreciated that the above-described arrangement for digital control of both the sound and animation of the toy FIG. 1 by the computer 30 facilitates various ways of using the computer 30 to synchronize the animation of the toy FIG. 1 with its audio output by, according to the present invention, transmitting properly timed digital-control signal sequences to the drive-control circuitry 36 (FIG. 2) with reference to and in concurrence with the audio playback by the computer's sound subsystem, provided that the total time of the control signal sequences and the timing unit of each of its element are properly determined based on the desired audio output. It is understood that it would be not difficult to provided realistic synchronization if the toy 's sound is of the type not including human speech, such as of the musical type without lyric, or if the movable body part of the toy does not include its mouth portion 12. However, speech synchronization, i.e., synchronizing the moving of the toy figure's mouth 12 with the audio playback for simulating talking of a human being would provide much better entertainment value.

According to one aspect of the present invention, the preferred speech synchronization method is to have the computer 30 create appropriate digital-control signals according to detailed text content and the timing control of the toy's audio playback, and transmit the desired sound signal and properly timed digital-control signal sequences to the speaker 44 and the drive-control circuitry 36 of the toy FIG. 1 respectively in a controlled sequential manner. The digital-control signal sequence may be created in such a way that each of its element and the timing unit thereof is directly associated with the arrangement of vowel letters in the text of the toy's speech. For example, the computer 30 may be provided with software system for generating drive-control signals for use to direct the toy FIG. 1 to open its mouth once on every or every other utterance of a vowel letter in the text data of the current speech, and the animation of the toy's other body part can be controlled based on the appearance of certain predefined words or phrases in said speech.

The general rules for creating the drive-control signals, according to the present invention, may be summarized as follows: 1) the number of parallel drive-control-signal sequences (or number or rows) for direct control of the drive device(s) 40/56 shall be made equal to the number of drive devices in the toy FIG. 1. For examples, if only the mouth 12 of the toy figure needs to be moved, the drive-control signals will be one dimensional for controlling the drive device 40 only, if the animation of the mouth 12 and the eye(s) 20/22 are required, two drive devices 40 and 38 are needed, and hence the drive-control signals will be two dimensional having two rows, etc.; 2) The length or number of elements of each continuous drive-control code sequence (s) is made equal to the total number of characters, symbols, and null spaces of a continuous audio speech sequence(s); 3) Each one of the drive-control codes is assigned with either "1" or "0", depending on the corresponding characters in the speech text string; 4) The timing unit for each control code is obtained by dividing the total time of said continuous audio speech sequence(s) by total number of elements of said drive-control code sequence.

It is appreciated that the aforesaid rules and the use of the devices 56 and 82 will provide direct association between the binary codes "1" and "0" and the "open" and "close" conditions of the drive device 56 (FIG. 3). Because the electro-mechanical drive device(s) 40/56 utilized for moving the toy's body part has a finite response time, the rules for creating the drive-control signals should further be dependent in part, on how fast the speech is to be spoken compared with the response time of the drive device(s). According to another aspect of the present invention, the movement of certain of the toy's body parts, such as its arm(s) 4/4', the entire head member 2, etc., may be set to be random or based on whether the current word or phrase in the audio speech belongs to a predefined vocabulary groups. The principle of creating the drive-control signals can be exemplified by, but not limited to, the following three cases with a sample audio speech shown as "yes, that was an apple, good!!":

In the first case, it is assumed that only the mouth 12 of the toy FIG. 1 can move and the speed of the audio speech is fast. Accordingly, the drive-control signals is one dimensional. Shown below is the derived drive-control signal sequence named "DC1" (the second row of the table) in association with the text string of said sample speech named "SP" (the first row):

| SP: | y | e | s | , |   | t | h | a | t |   | w | a | s |   | a | n |   | a | p | p | l | e | , |   | G | o | o | d | ! | ! |
|---|---|---|---|---|---|---|---|---|---|---|---|---|---|---|---|---|---|---|---|---|---|---|---|---|---|---|---|---|---|---|
| DC1: | 1 | 1 | 0 | 0 | 0 | 0 | 1 | 0 | 0 | 0 | 1 | 0 | 0 | 0 | 0 | 0 | 0 | 1 | 0 | 0 | 0 | 1 | 0 | 0 | 0 | 1 | 1 | 0 | 0 | 0 |

In this example, the code "1" in the array "DC1" represents activation of the drive device 40 for moving the mouth 12 by sending the signal "1" to the logic input of the logic switch circuitry 82 (FIG. 3), and the code "0" represents deactivation of the drive device 40 for returning the mouth 12 to its default or neutral position by sending the signal "0" to the logic input of the logic switch 82. The code array "DC1" is derived by applying the following rules in addition to the above-described general rules: 1) The code "0" will be assigned to each element of "DC1" unless the corresponding character in the text string "SP" is a vowel letter in which case the code "1" will be assigned; 2) Since the audio speech is fast and the device 40 has a finite response time, there is a constraint that any two "1" s in the array should be separated by at least three "0" s unless the two "1" s are next to each other, otherwise, the "1" behind shall be changed to "0".

In a second example, the movable body parts of the toy FIG. 1 include the mouth 12 and the arm 4, and the speed of the toy's audio speech is also fast. Accordingly, the drive-control code array is two dimensional having two rows: the first row named "DC1" is for controlling the mouth 12, and the second row named "DC2" is for control of the arm 4. In deriving the first row "DC1", all the rules defined in the first example are applied. In obtaining the second row "DC2", there is provided a predefined group of words including "yes", "good", "great", etc., stored in the computer 30; and it is defined that every element of the second row "DC2" is assigned with the code "0" unless the corresponding word in the text string belongs to said predefined group, and that all the "1" therefore obtained in the "DC2" are changed to "0" if the code in front of it is also "1". So the resultant drive-control codes together with the text string for the sample speech would be:

| SP: | y | e | s | , | t | h | a | t | | w | a | s | | a | n | | a | p | p | l | e | , | | G | o | o | d | ! | ! |
|---|---|---|---|---|---|---|---|---|---|---|---|---|---|---|---|---|---|---|---|---|---|---|---|---|---|---|---|---|---|
| DC1: | 1 | 1 | 0 | 0 | 0 | 0 | 1 | 0 | 0 | 0 | 1 | 0 | 0 | 0 | 0 | 0 | 1 | 0 | 0 | 0 | 1 | 0 | 0 | 0 | 1 | 1 | 0 | 0 | 0 |
| DC2: | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 1 | 0 | 0 | 0 | 0 | 0 |

In a third example, the mouth 12 and the arm 4 are again the movable parts of the toy FIG. 1, but it is assumed that the audio speech is relatively slow. So a two dimensional drive-control code array is obtained using the following rules: 1)The code "0" will be assigned to each element of a first row named "DC1" unless the corresponding character in the text string named "SP" is a vowel letter in which case the code "1" will be assigned; 2) if two "1" s are next to each other in "DC1", the one behind shall be changed to "0"; 3) any two "1" s in "DC1" shall be separated by at least two "0" s, otherwise, the one behind will be changed to "0"; 4) the appearance of the code "1" in a second row named "DC2" random, provided that the number of "1" s in this row is less then 30% of the total number of element in "DC2". The resultant two-dimensional drive control code array together with the text string of the sample speech would be shown as:

The digital-control signal sequences described hereinabove may be prerecorded in synchronous combination with the digital sound signal sequences for serving as synchronized source files or data for computer 30. In this case, the primary operation of the computer 30 is to concurrently control and transmit both the sound signals to the speaker 44 and the digital-control signals to the drive-control circuitry 36 of the toy FIG. 1 in a temporal or sequential manner. Said synchronized source file or data may be stored on an external data storage media 113, or in the computer's hard disc 104 or memory means 102. A synchronization dictionary including sufficient vocabulary of the aforesaid synchronized data may be stored in the computer so that the toy FIG. 1 can be programmed to display synchronized sound and animation in response to the computer 30 receiving text data input representing audio speech to be played back. Said text data input for computer 30 may be from the disk drive 104, or from one of the interactive input devices including the network connection means 115, the external data storage media 113, the keyboard 30*b*, the mouse 30*d*, the microphone 46, etc. For example, the computer can be programmed in such a way that after a user types in a text string from the keyboard 30*b* or talks to the microphone 46, the computer 30 will concurrently locate and process the related digital sound and drive-control signals from said synchronization dictionary stored for transmitting to and controlling, respectively, the speaker 44 and the drive device(s) 40/56 of the toy FIG. 1 in a desired synchronous manner, thus providing the synchronization.

The computer 30 may also be programmed to synchronize toy FIG. 1's sound and animation when the above-described synchronized data are not stored in the computer 30. In this case, since digital-control signals for controlling the toy's animation are not directly available in advance when text data representing the desired audio speech are provided, the computer 30 shall be installed with a synchronization software system for creating appropriate digital-control signals according to the text content of the audio playback according to the present invention by using the methods and rules described hereinabove. Said text data may be input to the

| SP: | y | e | s | , | t | h | a | t | | w | a | s | | a | n | | a | p | p | l | e | , | | G | o | o | d | ! | ! |
|---|---|---|---|---|---|---|---|---|---|---|---|---|---|---|---|---|---|---|---|---|---|---|---|---|---|---|---|---|---|
| DC1: | 1 | 0 | 0 | 0 | 0 | 0 | 1 | 0 | 0 | 0 | 1 | 0 | 0 | 1 | 0 | 0 | 1 | 0 | 0 | 0 | 1 | 0 | 0 | 0 | 1 | 0 | 0 | 0 | 0 |
| DC2: | 0 | 0 | 0 | 1 | 0 | 0 | 0 | 0 | 0 | 1 | 0 | 0 | 0 | 0 | 0 | 0 | 0 | 1 | 0 | 0 | 0 | 0 | 0 | 1 | 0 | 0 | 0 | 0 | 0 |

It is understood that the digital-control signals transmitted to the toy FIG. 1 from the computer 30 may be the same as, or different from, the above-described drive-control signals or codes received by the logic input of the logic switch portion 82 of the drive-control circuitry 36, depending on detailed structure of the interface system 106 of the computer 30 and the detailed arrangement of the circuitry 36, and that actual data file for the digital sound and control signals stored in the computer may be in a compressed or abbreviated or of other converted form standardized by the industry.

computer 30 directly from one of the above-described interactive input devices or from the hard disk 104, otherwise, appropriate software systems are to be installed in the computer 30 to obtain such text data. For example, if the desired audio playback of the toy FIG. 1 is a live or real-time voice recorded and received from the microphone 46 to the computer 30, a speech recognition software system needs to be provided to obtain text data for said real-time voice speech. In this example, the computer 30 will transmit said real-time voice input signals to the speaker 44, and in the meantime, create the digital-control signals from the text data obtained and transmit such control signals to the toy FIG. 1 so that the toy FIG. 1 will "repeat" the aforesaid live or real-time voice with synchronized animation.

According to another aspect of the present invention, the toy FIG. 1 and the computer 30 may be programed to display synchronized sound and animation in response or reacting to receiving a real-time external audio input from a user through the microphone 46 for simulating conversation (listening and talking) of the toy FIG. 1 with the user, provided that the toy's audio output is associated with said real-time audio input in a predetermined manner. Alternatively, computer 30 may be programmed to create both the drive-control signals and the audio speech for the toy FIG. 1 from an existing text data file by utilizing sound synthesizing system of the computer in combination with the above-described synchronization system.

Figure 5:
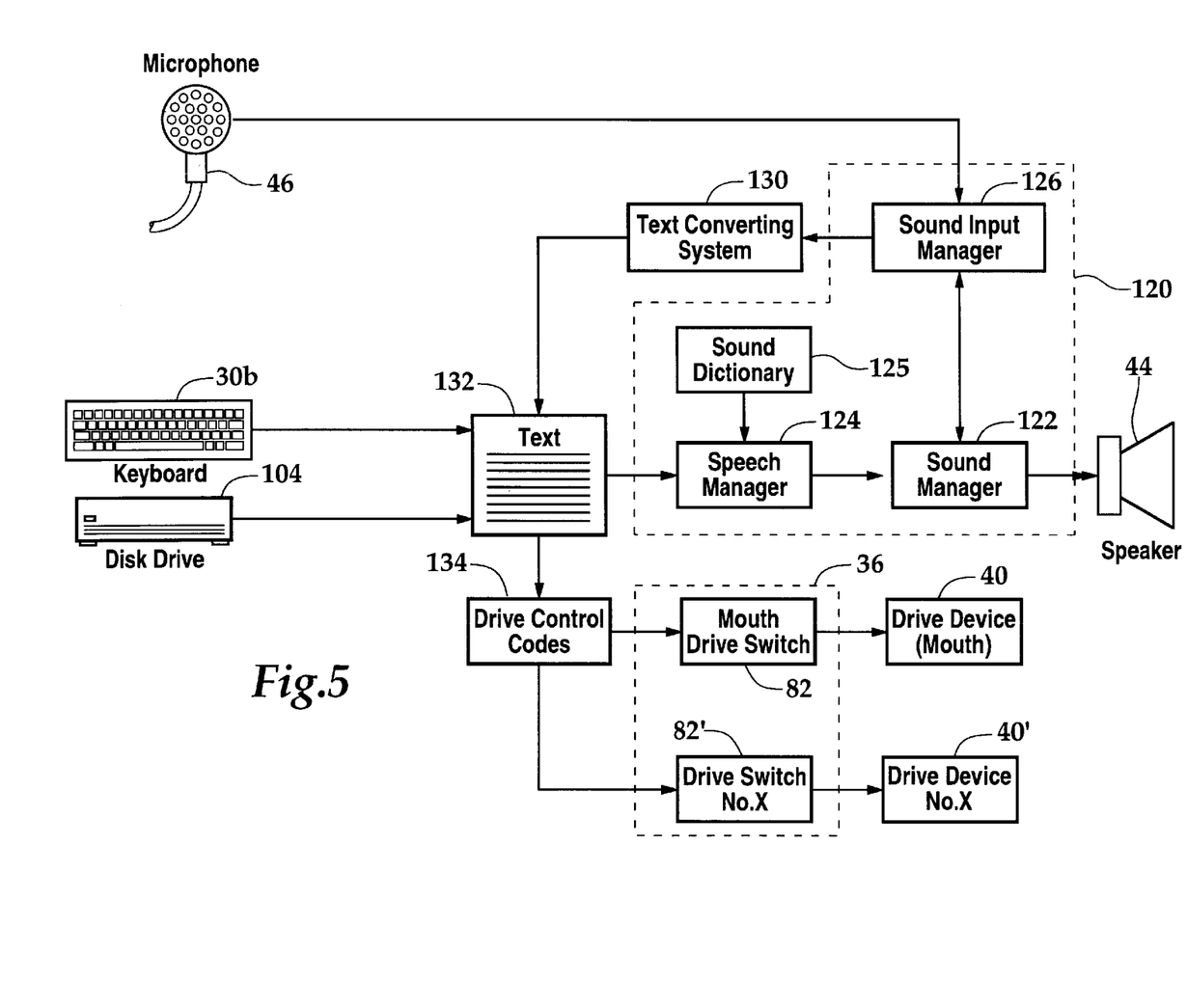
FIG. 5 is a block diagram of a sample computer operation and synchronization systems for controlling the sound and animation of the toy figure of FIG. 1.

Referring now to FIG. 5 in conjunction with FIGS. 1, 2, 3, and 6, in addition to the microphone 46, keyboard 30b, disk drive 104, and the speaker 44 as described above, the computer 30 shall also includes appropriate operation subsystems, including all necessary hardware and supporting software, for providing the above-described functions. For example, as seen in FIG. 5, the computer 30 may include the following subsystems: 1) A sound manager 122 for playing back recorded sound, i.e., it generates from digital sound data an analog signal for speaker 44, provided that said sound manager 122 may also includes means for altering the characteristics of its audio output such as its loudness, pitch, timbre, and duration, etc.; 2) A speech manager 124 for converting text data into digital audio signals representing spoken words for playback by said sound manager 122, provided that said speech manager 124 may include speech synthesizer system; 3) A sound input manager 126 for recording digital sound signals in response to audio input received by the microphone 46 or from other sound input device, provided that said recorded digital sound signals may be sent directly to said sound manager 122 for real-time play back; 4) A text converting or speech recognition system 130 for creating or converting text data 132 from said digital sound signals recorded by the sound input manager 126. It is understood that the aforesaid subsystems, including the sound manager 122, speech manager 124, and the sound input manager 126 etc., may be included in a standard sound subsystem of a standard multimedia computer. The computer 30 may also include a prerecorded sound dictionary 125 in its hard disk or in the memory 102 for playback.

As seen in FIG. 5, during a synchronization process, a drive-control code array 134 is obtained for controlling the drive-control circuitry 36 of the toy FIG. 1 by the computer 30. The drive-control circuitry 36 includes a plurality of logic switch(es) 82 (82'), as described hereinabove, for controlling power supply for the respective drive device(s) according to the drive control codes 134 transmitted from the computer 30. The computer 30 may also be provided with the aforesaid synchronization software system (not shown in the drawing) for creating or converting the drive control codes 134 from the text data 132 when said control codes 134 are not directly available from an existing source file. As described above, since the drive-control code sequences 134 have the same temporal basis as the corresponding audio sequences sent to the speaker 44, synchronization of the sound and animation of the toy FIG. 1 is provided by coordinating and controlling sequential transmission of said the drive-control code sequences 134 to the toy's actuation system 36 in parallel and concurrence with transmission of said audio speech sequences to the toy's audio output means 44. During the operation, the control and processing system of the computer 30 causes to be processed by the sound manager 122 a digital sound file, or a portion thereof, representing the speech to be played back through the speaker 44 and to sequentially send each properly timed digital-control signal, or set of signals, from array 134 to the drive control 36 of the toy 1 through the interface subsystem 106 provided, thus providing the synchronization.

Figure 7:
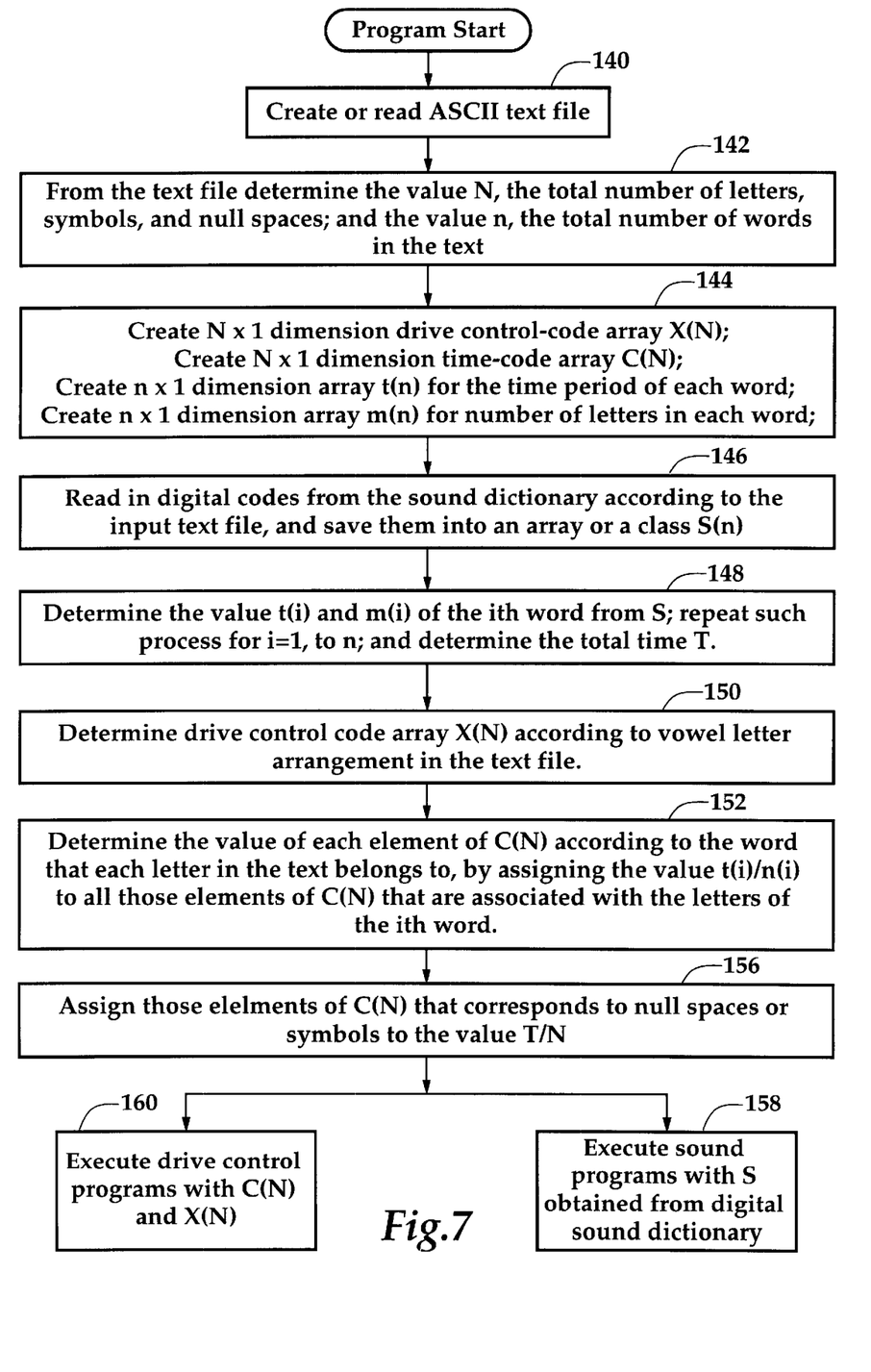
FIG. 7 is a simplified sample flow chart showing the flow of a program running on a computer for deriving digital-control signals from a text file for controlling the sound and animation of the toy of FIG. 1.

In FIG. 7 is exemplified a simplified process executed by computer 30 for deriving from a text file, such as an ASCII character text file, a drive-control code array having, for purposes of illustration only, a single dimension for controlling the mouth 12 of the toy FIG. 1, as well as digital sound file for playing back, with the understanding that an actual computing process may involve different or more detailed procedures and may utilize different data structures. Beginning at step 140, an ASCII text file is created or read in. From the text file at step 142, the total number of characters "N", including letters, symbols and null spaces in the text, and the total number of word "n" are determined. Then at step 144 are created a N-element drive-control code array X(N), a N-element timing control array C(N) representing timing unit of each element of the control-code array X(N), a n-element word-timing array t(n) representing timing of each word in said text file, and a n-element word-counting array m(n) representing number of letters in each word of said text file. Digital waveforms for each word are synthesized or looked up in a sound dictionary by the computer thereafter at step 14 and save in form of a data structure S(n) which may be in form of an array or a class or the like or of other form. The values of each element, t(j) and m(j) (j represents jth word of the text) of the word-timing array t(n) and the word-counting array m(n) respectively, as well as the value of the total playback time T for the entire audio sequences are derived at step 148. The value of each element of the control-code array X(N) is derived at step 150 according the arrangement of vowel letters in the aforesaid text file, employing the concepts and methods described hereinabove. The value of each element of the timing control array C(N) is derived at step 152 by assigning the value t(j)/n(j) to those elements of C(N) that are associated with or correspond to the jth word of the text file, and at step 156 by assigning the value T/N to those elements of C(N) that correspond to null spaces and typographic symbols in the text file. Then at step 158, the computer initiates playback of the desired digital sound by the sound manager 122 and transmission of digital-control signals corresponding to array X(N) timed by the array C(N) to the toy FIG. 1.

According to yet another aspect of the present invention, the computer 30 may be programmed to direct its sound subsystems to synthesize sound of selected word or phrase with special characters, such as with a different tone, and there can be various methods of selecting the words that need to be pronounced specially. For example, a user can use one of the interactive input devices such as the keyboard 30b, the mouse 30d, or the microphone 46 of the computer 30 to fill in text tables displayed on the computer monitor 30c, to highlight words or phrases in a text file displayed, or to answer audio or textual questions requested by the computer; or a custom-designed software routine may be provided to detect if any of the phrases in a text file needs to be pronounced specially. The multimedia computer 30 may be programmed to include, for example and for purposes of illustration only, three different types of sound for the toy FIG. 1's speech, i.e., a regular style, a funny type, and a scary tone, each having a sound-font icon for display on the monitor; When the text file of the desired audio speech is shown on the monitor 30c, a user can use the mouth 30d to highlight phrases to be pronounced specially, followed by selecting one of the sound-font icon displayed for choosing the desired sound characters of the highlighted phrases.

It is understood that the toy FIG. 1's speech may be of any type of human languages, and it may be provided with musical background for simulating singing a song or the like. In order to improve its entertainment and/or education value, the computer 30 may be programmed to display images or motion pictures or custom-designed digital video on the monitor 30c in accordance with and/or for serving as a background for the animated talking toy FIG. 1. For example, an animated image character can be displayed on the monitor 30c to have conversation with the toy FIG. 1. Another advantage of including said audio/video background for the toy FIG. 1 is that the duty cycle of the drive device 56 of the toy can be reduced, and hence the entire system can last much longer time without overheating the device 56.

It is further understood that additional hardware devices and/or software system may be included in the computer-controlled toy system of the present invention for providing more optional features. For examples, devices such as sound-activating sensors, thermal sensors, Light-emitting devices, and/or touch detectors, or the like may be added to the embodiment to provided the toy FIG. 1 with more interactive features such as responding to the touching/talking of a user and/or illuminating certain of its body portion for enriching the "expression" of the toy FIG. 1; a joy-stick device or the like or a special keyboard may be provided and connected to the computer 30 for enhancing the interactive features of the system; and the torso portion 3 of the toy FIG. 1 may include an interchangeable cloth for preventing a child user from being tired of seeing the same figure. The interactive toy system of the present invention may also be utilized as an education tool as well as an entertainment device. In order to improve its education value, a remote control system may be added to the computer 30 so that a teacher or a parent can control and run an existing education program from distance and in the meantime monitor the reaction and expression of the children or students; or a computer-toy network system may be established for running an education program at multiple places at the same time.

According to yet another aspect of the present invention, the interface subsystem 106 and the sound subsystem 116 of the computer 30 may be adapted to have multiple channels for connecting to and controlling more than one toy figure of the type described hereinabove, thus allowing a story or a "live-movie" to be presented to a child with "live" dolls or animals.

Naturally, the embodiment of the computer-controlled interactive toy system of the present invention is not limited to the above-described examples. While certain novel features of this invention have been shown and described and are set out in the appended claims, it will be understood that various substitutions and changes in the forms and details of the devices and software systems described throughout this invention and in their operation can be made by those skilled in the art without departing from the spirit of the invention.

What is claimed is:

1. In combination with a multimedia computer, an animated talking toy including a body portion having at least one movable portion and a loudspeaker situated within said body for reproducing selected audio sound in response to receiving an external sound signal transmitted from the multimedia computer, the improvement therein including actuation means situated within said body and operable by an external digital animation-control signal transmitted from the multimedia computer, said actuation means including:

an actuator for moving said movable portion; and actuation-control means for controlling the actuator;

said actuator having only two phases for moving said movable portion in response to said actuation-control means receiving said external digital animation-control signal.

2. The improvement of claim 1, wherein said actuator comprises a solenoid means having a wiring coil and a magnetic plunger member disposed therein and attached to said movable portion, and wherein said actuation-control means includes means for selectively switching electric current to said wiring coil in response to receiving said external digital animation-control signal so as to move the plunger member and hence the movable portion.

3. An animated talking toy figure adapted to receive an external digital animation-control signal sequence and an external sound signal sequence representing a selected audio sound, said toy figure including:

a body having at least one movable portion;

an audio output means situated within said body for reproducing the selected audio sound in response to the toy receiving the sound signal sequence; and actuation means situated within said body and operable by the external digital animation-control signal sequence for actuating said movable portion.

4. The animated talking toy figure as set forth in claim 3, wherein said actuation means includes actuation-control means operable by said external digital animation-control signal sequence and an actuator having only two phases for moving said movable portion in response to said actuation-control means receiving the external digital animation-control signal sequence.

5. The animated talking toy figure as set forth in claim 4, wherein said actuator comprises a solenoid means having a wiring coil and a magnetic plunger member disposed therein and attached to said movable portion of the toy, and wherein said actuation-control means includes means for selectively switching electric current to said wiring coil in response to the actuation-control means receiving said external digital animation-control signal sequence so as to actuate said plunger member and hence said movable portion.

6. The animated talking toy figure as set forth in claim 5, wherein said actuator further includes means for coupling said movable portion of the toy to said plunger member of the solenoid, wherein said external sound and digital animation-control signals are wireless signals, and wherein the toy body further includes conventional receiving devices for receiving said wireless signals.

7. The animated talking toy figure as set forth in claim 6, wherein said means for coupling includes, means for attaching said movable portion of the toy to said plunger member of the solenoid so as to apply torque to pivotally move the movable portion by the plunger member, and a return spring means attached to the movable portion for applying a biasing force to the movable portion in an opposite direction to the force applied by the plunger member.

8. The animated talking toy figure as set forth in claim 5, wherein said actuation-control means further includes, means for transferring said external digital animation-control signal sequence received to a subsequent digital signal sequence comprising a sequence of a first and a second logic signals for representing animated and default positions of said movable portion of the toy figure respectively, and logic input means for receiving said subsequent digital signal sequence, and wherein said means for switching electric current connects electric current of appropriate intensity to said wiring coil of the solenoid in response to said logic input means receiving the first logic signal so as to move said plunger member and hence said movable portion attached thereto and disconnects electric current from the wiring coil in response to the logic input means receiving the second logic signal so as to return the movable portion to its default position.

9. The animated talking toy figure as set forth in claim 3, wherein said body further includes a second movable portion, wherein said external digital animation-control signal sequence includes a second digital control signal sequence, and wherein said actuation means includes a first and a second actuators for causing independent movements of said two movable portions of the toy respectively in response to the actuation means receiving the respective first and the second external digital control signal sequences.

10. An animated talking toy adapted to be controlled by a multimedia computer and responsive to receiving a sequence of sound signals representing a selected audio speech and a sequence of digital animation-control signals transmitted from the computer, said animated talking toy comprising:
   a toy figure having a body portion including at least one movable portion;
   an audio output means situated within said body for reproducing the selected audio speech in response to the toy receiving said sound signal sequence; and
   actuation means situated within said body, including an actuation-control means operable by said digital animation-control signals and an actuator for moving said movable portion in response to the actuation-control means receiving the digital animation-control signals;
   said digital animation-control signal sequence being associated with said selected audio speech in a predetermined manner and transmitted to the toy in synchronization with the transmission of said sound signal sequence to the toy.

11. The animated talking toy as defined in claim 10, wherein said at least one movable portion includes a mouth, and wherein said digital animation-control signal sequence represents movement of the mouth in synchronization with transmission of said sound signal sequence to simulate speaking.

12. The animated talking toy as defined in claim 10, wherein said toy further includes a second movable portion, wherein said digital animation-control signal sequence includes a second digital control signal sequence, and wherein said actuation means further includes a second actuators for causing movement of said second movable portion in response to the actuation means receiving the second digital control signal sequence, said movement of the second movable portion being independent of that of the first movable portion.

13. The animated talking toy as defined in claim 10, wherein said actuator comprises a solenoid means having a wiring coil and a magnetic plunger member disposed therein and attached to said movable portion, and wherein said actuation-control means includes a logic input means for receiving said digital animation-control signals and means for selectively switching electric current to said wiring coil of the solenoid for causing movement of the plunger member And the movable portion in response to the input means receiving the animation-control signals.

14. The animated talking toy as defined in claim 10, wherein said digital animation-control signal sequence comprises a sequence of a first and a second logic signals indicating a first and a second positions of said movable portion and representing a first and a second predefined binary digital values respectively, and wherein said predetermined manner comprises association of each letter, typographic symbol, and null space in the text of said audio speech with one of said binary digital values according to arrangement of vowel letters in said text and according to the speed and total time of each continuous portion of said audio speech.

15. The animated talking toy as defined in claim 14, wherein said predetermined manner further comprises association of the timing period of each said logic signal of said animation-control signal sequence with average timing unit of the corresponding continuous portion of said preselected audio speech, said average timing unit being equal to the total time of said continuous portion divided by total number of letters, typographic symbols, and null spaces in the text of said continuous portion.

16. The animated talking toy of claim 10 further including a microphone means situated within said body for converting an external audio sound received by the toy to an electrical signal for transmission to the computer.

17. In combination, an animated talking toy operable by an external binary digital animation-control signal for controlling the animation thereof and by an external sound signal for providing and controlling the sound thereof, a multimedia computing means for generating a sound signal sequence, representing a preselected audio speech, and a sequence of binary digital animation-control signals for transmission to said toy, and means for transmitting said sound signal sequence and said digital animation-control signal sequence from said multimedia computing means to said toy,
   said toy comprising,
      a toy figure with an appearance simulating that of a living being, including a body and a movable mouth,
      an audio output means situated within said body for reproducing the preselected audio speech in response to the toy receiving the sound signal sequence, and
      actuation means situated within said body and feasible for digital control, including an actuation-control means operable by said binary digital animation-control signals and an actuator for moving the movable mouth in response to the actuation-control means receiving the animation-control signals, said multimedia computing means including,
      means for generating the sound signal sequence for transmission to said audio output means over said means for transmitting,
      means for generating, based on textual content and speed of said selected audio speech, the animation-control signal sequence for transmission to said actuation means over said means for transmitting, and
      means for causing synchronous transmission of said animation-control signal sequence to said actuation means and said sound signal sequence to said audio output means.

18. The combination of claim 17, wherein said animation-control signal sequence comprises a sequence of a first and a second binary logic signals, wherein said actuation-control means includes means for selectively switching electric current to said actuator in response to receiving said binary logic signals, and wherein said actuator has only two phases for moving said movable mouth in a first direction in response to said actuation-control means receiving the first binary logic signal and in the other direction in response to said actuation-control means receiving the second binary logic signal.

19. The combination of claim 17, wherein said animation-control signal sequence comprises a sequence of a first and a second binary logic signals representing a first and a second predefined binary codes respectively, wherein said means for generating animation-control signal sequence includes means for sequencing said binary logic signals by assigning one of said binary codes to each letter in said textual content, according to the speed of said preselected audio speech, the reaction time of said actuator, and the arrangement of vowel letters in said textual content, for defining logic level of each said binary logic signal and for indicating positions of said movable mouth, and by constructing the timing period for each said logic signal of the animation-control signal sequence according to the speed of said preselected audio speech.

20. The combination of claim 17, wherein said multimedia computing means further includes means for storing text data representing the selected audio speech for being processed by the computing means, and wherein said means for generating sound signal sequence includes speech synthesizing means for synthesizing, based on said text data, the sound signal sequence.

21. The combination of claim 20, wherein said multimedia computing means further includes means for storing a lookup dictionary comprising digital sound data representing a plurality of predefined spoken words in combination with predetermined synchronization-control codes, wherein said means for generating digital animation-control signal sequence includes means for selecting and sequencing, based on said text data, said synchronization-control codes in the lookup dictionary for constructing the digital animation-control signal sequence, and wherein said means for generating sound signal sequence includes means for selecting and sequencing, based on the text data, said digital sound data in the lookup dictionary for constructing the sound signal sequence.

22. The combination of claim 17, wherein said toy figure further includes a microphone means situated within said body for converting an external audio sound received by the toy to an electrical signal for transmission to said multimedia computing means over said means for transmitting, and wherein said multimedia computing means further includes means for recording said external audio sound received by the toy and means for recognizing textual content of said external audio sound.

23. The combination of claim 22, wherein said means for generating sound signal sequence further includes means for playing back said external audio sound in real time, and wherein said means for causing synchronous transmission includes means for synchronizing said playing back of the external audio sound with transmission of said animation-control signal sequence from said computing means to said toy.

24. The combination of claim 17, wherein said multimedia computing means further includes a monitor and means for displaying image animation on said monitor in coordination with said movable mouth.

25. The combination of claim 17, wherein said means for transmitting comprises an elongated cable extending from said toy to said multimedia computing means.

26. The combination of claim 17, wherein said animated talking toy further includes, a second body having a movable mouth, a second audio output means situated within said second body for reproducing a second selected audio speech in response to receiving a second sound signal sequence transmitted from the computing means, and a second actuation means situated within said second body for moving the movable mouth thereof, and wherein said multimedia computing means includes, means for generating the second sound signal sequence representing the second selected audio speech for transmission to said second audio output means over said means for transmitting, means for generating, based on textual content and speed of said second selected audio speech, a second binary digital animation-control signal sequence for transmission to said second actuation means over said means for transmitting, means for causing synchronous transmission of said second digital animation-control signal sequence to said second actuation means and said second sound signal sequence to said second audio output means, and means for coordinating the sound and animation of the second toy body with that of the first toy body.

* * * * *